US011935686B2

(12) United States Patent
Wakabayashi

(10) Patent No.: US 11,935,686 B2
(45) Date of Patent: Mar. 19, 2024

(54) METHOD FOR MANUFACTURING A COIL ELEMENT

(71) Applicant: TAIYO YUDEN CO., LTD., Tokyo (JP)

(72) Inventor: Hirotaka Wakabayashi, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 715 days.

(21) Appl. No.: 17/085,881

(22) Filed: Oct. 30, 2020

(65) Prior Publication Data

US 2021/0050143 A1 Feb. 18, 2021

Related U.S. Application Data

(63) Continuation of application No. 16/377,684, filed on Apr. 8, 2019, now Pat. No. 10,854,371, which is a
(Continued)

(30) Foreign Application Priority Data

Aug. 31, 2016 (JP) ................................ 2016-169453

(51) Int. Cl.
*H01F 7/06* (2006.01)
*H01F 5/04* (2006.01)
(Continued)

(52) U.S. Cl.
CPC ........... *H01F 27/2823* (2013.01); *H01F 5/04* (2013.01); *H01F 17/045* (2013.01); *H01F 27/24* (2013.01);
(Continued)

(58) Field of Classification Search
CPC ................. H01F 27/24; H01F 27/2823; H01F 27/2828; H01F 27/29; H01F 27/292;
(Continued)

(56) References Cited

U.S. PATENT DOCUMENTS 6,119,924 A 9/2000 Toi et al.
2006/0071749 A1 4/2006 Aoki
(Continued)

FOREIGN PATENT DOCUMENTS

JP 11-238634 A 8/1999
JP 2004-006904 A 1/2004
(Continued)

OTHER PUBLICATIONS

Notice of Reasons for Refusal Japanese Patent Application No. 2016-169453 dated Nov. 20, 2018 with English translation.
Notice of Reasons for Refusal Japanese Patent Application No. 2016-169453 dated May 17, 2019 with English translation.

*Primary Examiner* — Paul D Kim
(74) *Attorney, Agent, or Firm* — Pillsbury Winthrop Shaw Pittman, LLP

(57) ABSTRACT

A coil element includes a core member, a plate portion connected to one end of the columnar portion, a coil conductor wire, and a terminal electrode. The core member has a flat-shaped connection end portion provided in each of both end portions of the coil portion. The plate portion has a principal surface, a first surface connected to the principal surface, and a second surface connected to the principal surface and the first surface. The terminal electrode has an electrode layer and a joint layer. The electrode layer is formed on either the first surface or the second surface of the plate portion. The joint layer includes a cavity portion locally provided between the connection end portion and the electrode layer and joins the connection end portion and the electrode layer to each other.

11 Claims, 6 Drawing Sheets

Related U.S. Application Data continuation of application No. 15/668,880, filed on Aug. 4, 2017, now Pat. No. 10,297,382.

(51) Int. Cl.

| | |
|---|---|
| ***H01F 17/04*** | (2006.01) |
| ***H01F 27/24*** | (2006.01) |
| ***H01F 27/28*** | (2006.01) |
| ***H01F 27/29*** | (2006.01) |
| ***H01F 27/30*** | (2006.01) |
| ***H01F 41/066*** | (2016.01) |
| ***H01F 41/10*** | (2006.01) |

(52) U.S. Cl.

CPC ......... *H01F 27/2828* (2013.01); *H01F 27/29* (2013.01); *H01F 27/292* (2013.01); *H01F 27/306* (2013.01); *H01F 41/066* (2016.01); *H01F 41/10* (2013.01); *H01F 2005/046* (2013.01)

(58) Field of Classification Search

CPC ...... H01F 27/306; H01F 41/066; H01F 41/10; H01F 5/04; H01F 17/045; H01F 2005/046

See application file for complete search history.

(56) References Cited

U.S. PATENT DOCUMENTS

| | | | | |
|---|---|---|---|---|
| 2009/0273426 | A1* | 11/2009 | Urabe .................. | H01F 41/076 29/606 |
| 2013/0314191 | A1 | 11/2013 | Bechler | |
| 2016/0012961 | A1 | 1/2016 | Suzuki et al. | |
| 2016/0118183 | A1 | 4/2016 | Wada | |
| 2017/0200554 | A1 | 7/2017 | Kudo et al. | |

FOREIGN PATENT DOCUMENTS

| | | | |
|---|---|---|---|
| JP | 2010-171054 | A | 8/2010 |
| WO | 2009/037978 | A1 | 3/2009 |

* cited by examiner

METHOD FOR MANUFACTURING A COIL ELEMENT

CROSS-REFERENCE TO RELATED APPLICATIONS

This application is a Continuation of U.S. patent application Ser. No. 16/377,684 (filed Apr. 8, 2019), now U.S. Pat. No. 10,854,371, which is a Continuation of U.S. patent application Ser. No. 15/668,880 (filed on Aug. 4, 2017), now U.S. Pat. No. 10,297,382, which claims the benefit of priority from Japanese Patent Application Serial No. 2016-169453 (filed on Aug. 31, 2016), the contents of which are hereby incorporated by reference in their entirety.

TECHNICAL FIELD

The present invention relates to a wire-wound coil element.

BACKGROUND

As one type of coil element, a wire-wound coil element is known. For example, Japanese Patent Application Publication No. 2004-6904 (the '904 Publication) describes an electronic element formed of an insulating substrate on which a Cu wire is wound, a terminal of which is embedded by thermocompression bonding in an electrode (a Sn—Cu plated layer) formed on said insulating substrate and brazed in that state.

Furthermore, Japanese Patent Application Publication No. 2010-171054 (the '054 Publication) discloses a wire-wound electronic element having a core on which a conductor wire is wound, an upper flange and a lower flange formed at an upper end and a lower end of the core, respectively, and a pair of external electrode portions formed at different positions in a bottom end portion of the lower flange and configured to receive both terminal portions of the conductor wire connected thereto, respectively. The above-described external electrode portions each have a concave portion including a groove formed on a bottom surface of the lower flange and solder filled in the concave portion, and are configured so that the terminal portions of the conductor wire led into the groove are embedded in the solder.

In recent years, with improvement in performance of electronic devices including portable devices, there is a demand for higher performance of elements used in such electronic devices. Particularly, for portable devices, emphasis is often placed on power consumption, leading to a demand for a reduction in resistance of coil elements.

A configuration of the '904 Publication, however, presents a problem that a wire used therein has a relatively thin diameter of 20 μm to 60 μm, and thus a reduction in resistance of a coil element based on a wire cross-sectional area can hardly be achieved. On the other hand, according to a configuration of the '054 Publication, a conductor wire having a thickness of 30 μm to 350 μm can be used, and thus this configuration is advantageous in achieving a reduction in resistance. This method, however, requires that a large amount of solder be filled in the concave portion so that connection is securely established and consequently presents a problem that a size reduction can hardly be achieved due to a thickness of the solder.

On the other hand, in the method in which an end portion of a conductor wire is joined to an electrode by thermocompression bonding, the conductor wire has a width larger than its height (thickness) in a joint layer, so that it becomes likely that stress in a width direction is applied to the conductor wire. This has let to a problem that a defect such as a crack occurs in the joint layer, and thus when the joint layer is subjected to a load such as thermal stress or a drop impact, joint strength is decreased significantly.

SUMMARY

In light of circumstances thus described, the present invention has as its object to provide a coil element capable of enhancing reliability of joint strength of a coil conductor wire, while achieving a reduction in resistance and a size reduction.

In order to achieve the above-described object, a coil element according to one embodiment of the present invention includes a core member, a coil conductor wire, and a terminal electrode. The above-described coil member has a columnar portion. The above-described coil conductor wire has a coil portion wound on the above-described columnar portion and a flat-shaped connection end portion provided in each of both end portions of the above-described coil portion. The above-described terminal electrode has an electrode layer and a joint layer. The above-described electrode layer is formed on a surface of the above-described core member and opposed to the above-described connection end portion in a thickness direction of the above-described connection end portion. The above-described joint layer includes a cavity portion locally provided between the above-described connection end portion and the above-described electrode layer and joins the above-described connection end portion and the electrode layer to each other.

A ratio of a width of the above-described connection end portion to a thickness thereof is not particularly limited and is, for example, not less than 2.5 and not more than 4.5.

A ratio of a total length of the above-described cavity portion along a direction of a width of the above-described connection end portion to the abovedescribed width is not particularly limited and is, for example, not less than 0.05 and not more than 0.50.

It may also be possible that the above-described joint layer has a first conductive layer covering the above-described electrode layer, a second conductive layer covering the above-described first conductive layer, and an alloy layer provided between the above-described connection end portion and the above-described first conductive layer.

Typically, the above-described cavity portion is provided at an interface between the above-described connection end portion and the above-described electrode layer.

Advantages

As thus described, according to the present invention, it is possible to enhance reliability by suppressing a decrease in joint strength of a coil conductor wire, while achieving a reduction in resistance and a size reduction.

DESCRIPTION OF THE PREFERRED EMBODIMENTS

By referring to the appended drawings, the following describes an embodiment of the present invention.

Figure 1:
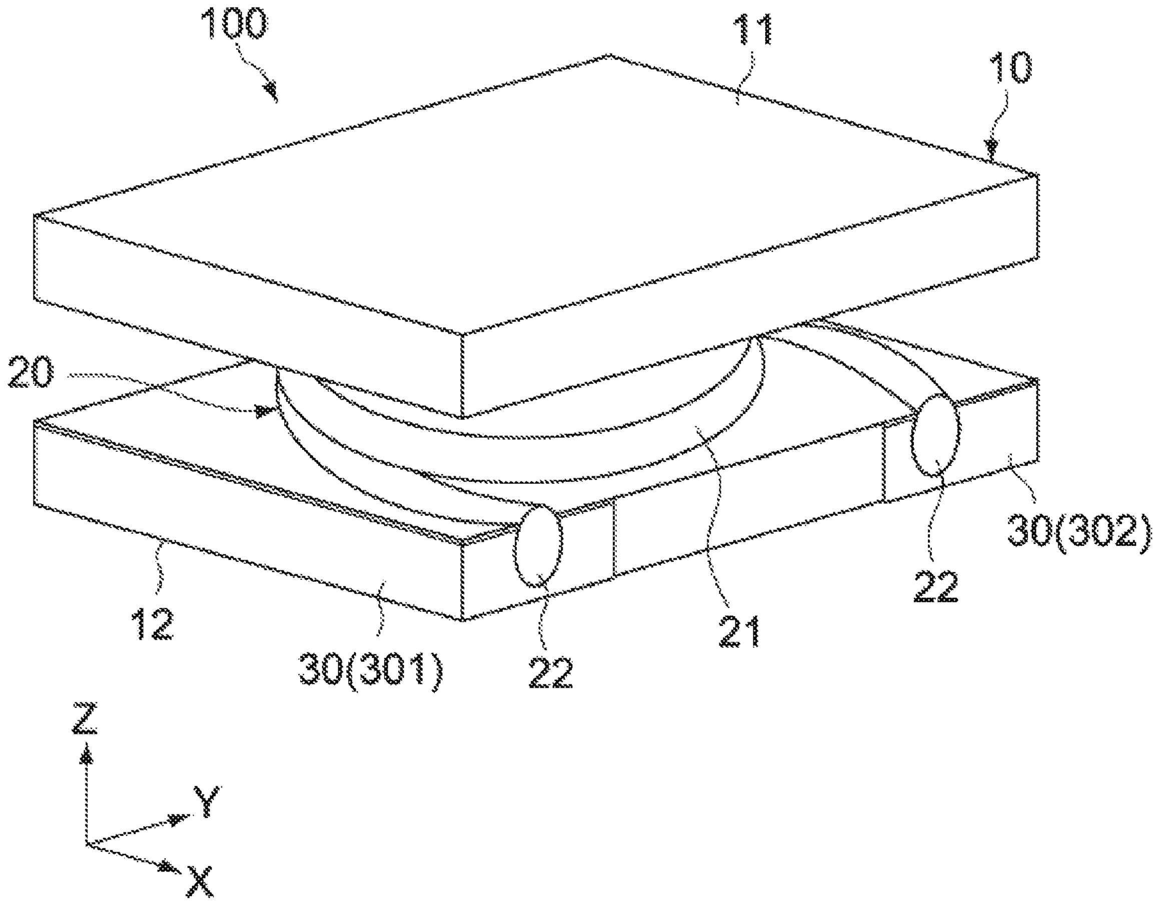
FIG. 1 is a schematic perspective view showing a coil element according to one embodiment of the present invention.
Figure 2A:
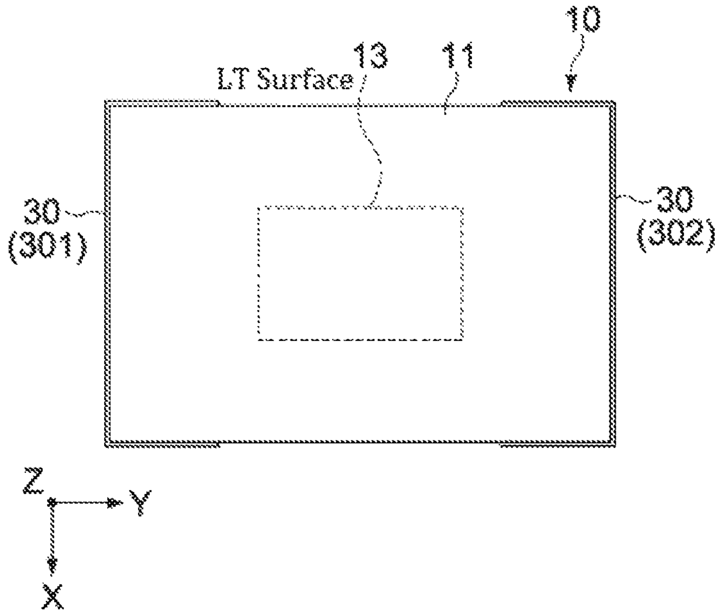
FIG. 2A schematically shows a plan view of a core member in the abovedescribed coil element.
Figure 2B:
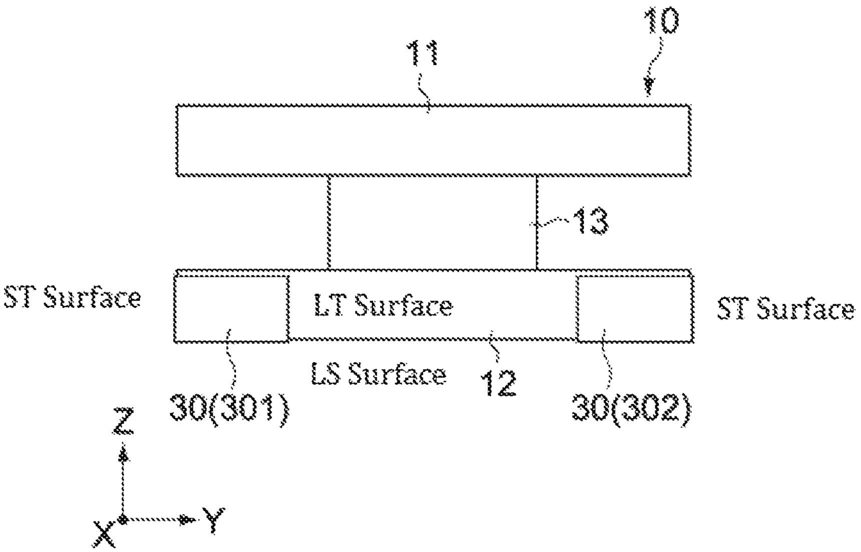
FIG. 2B schematically shows a side view of the core member in the abovedescribed coil element.
Figure 2C:
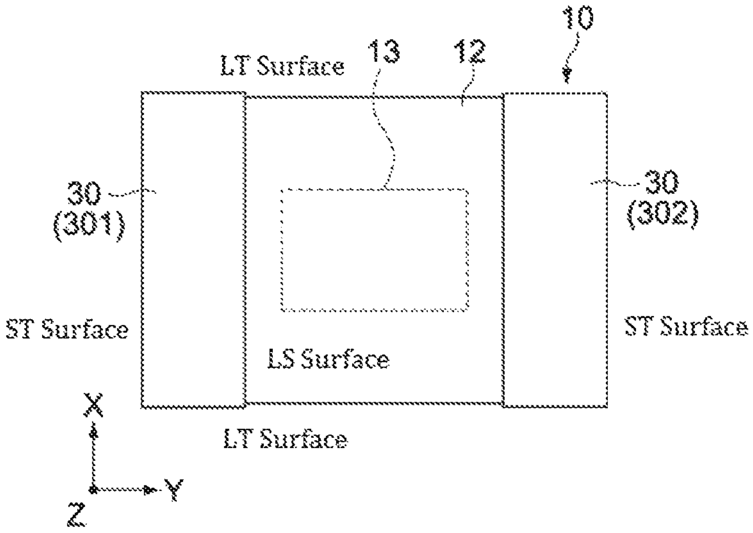
FIG. 2C schematically shows a bottom view of the core member in the above-described coil element.

FIG. 1 is a schematic perspective view showing a coil element according to one embodiment of the present invention. FIGS. 2A, 2B, and 2C are schematic views of a core member in said coil element, with FIG. 2A showing a plan view FIG. 2B showing a side view, and FIG. 2C showing a bottom view. In these figures, an X axis, a Y axis, and a Z axis indicate three-axis directions orthogonal to each other, respectively.

[Overall Configuration] A coil element 100 of this embodiment may have a core member 10, a coil conductor wire 20, and a terminal electrode 30. The coil element 100 may not be particularly limited in size and have, in this embodiment, a width dimension along an X axis direction of about 2 mm, a length dimension along a Y axis direction of about 2.5 mm, and a height dimension along a Z axis direction of about 1 mm.

The core member 10 may have a first plate portion 11, a second plate portion 12, and a columnar portion 13.

The columnar portion 13 may be formed in the shape of a prism having an axis parallel to the Z axis direction. A shape of the columnar portion 13 may not be limited thereto, and it may also be possible that the columnar portion 13 has any other shape such as a cylindrical shape or an elliptic cylindrical shape. The columnar portion 13 may be configured as a winding core of the coil conductor wire 20 and have a length and a cross-sectional size appropriately set in accordance with a wire diameter, a length (the number of turns), or the like of the coil conductor wire 20. In this embodiment, the columnar portion 13 may have a length of a shorter side along the X axis direction of about 1.0 mm and a length of a longer side along the Y-axis direction of about 1.4 mm.

The first plate portion 11 may be connected to one end portion (an upper end portion in FIG. 2B) of the columnar portion 13, and the second plate portion 12 may be connected to the other end portion (a lower end portion in FIG. 2B) of the columnar portion 13. The first and second plate portions 11 and 12 each may be formed in a rectangular shape having a longer side in the Y axis direction and a shorter side in the X axis direction, and the end portions of the columnar portion 13 may be connected to center portions of the first and second plate portions 11 and 12, respectively. The first and second plate portions 11 and 12 may be formed to be equal in size and have, in this embodiment, a length of the shorter side of about 2.0 mm, a length of the longer side of about 2.5 mm, and a thickness of about 0.24 mm.

The second plate portion 12 may have, on both left and right ends thereof in FIGS. 2B and 2C, two planes (hereinafter, each referred to also as an ST surface) defined by the shorter side and a side thereof in a thickness direction and have, on both front and rear ends thereof in FIG. 2B (both upper and lower ends thereof in FIG. 2C), two planes (hereinafter, each referred to also as an LT surface) defined by the longer side and the side thereof in the thickness direction. The second plate portion 12 may further have an outer-side principal surface (hereinafter, referred to also as an LS surface) defined by the longer side and the shorter side.

Typically, the first plate portion 11, the second plate portion 12, and the columnar portion 13 may be made of an electrically insulating magnetic material and formed integrally with each other. A type of the magnetic material may not be particularly limited, and a ferrite material, metallic magnetic particles, and so on can be used.

The ferrite material may be a material in which magnetism is exhibited in a composite oxide of an iron oxide and another type of metal oxide, and any known type of ferrite material can be used without any particular limitation thereto. For example, Ni—Zn ferrite, Mn—Zn ferrite, and so on can be used favorably. Such a ferrite material may be mixed with a binder, and pressure may be applied to this mixture by using a metal die to form a drum shape, which then may be fired or otherwise treated, and thus the first and second plate portions 11 and 12 and the columnar portion 13 can be obtained. It may also be possible that the core member 10 made of the ferrite material is surface-treated such as by being coated with glass.

The metallic magnetic particles may be of a material in which magnetism is exhibited in an unoxidized metal portion, and examples thereof may include, for example, unoxidized metal particles or alloy particles, or particles obtained by providing an oxide or the like around such particles. The metallic magnetic particles can be those manufactured by, for example, an atomizing method. Examples of the metallic magnetic particles may include, for example, particles of an Fe—Si—Cr, Fe—Si—Al, or Fe—Ni alloy, an Fe—Si—B—C or Fe—Si—B—Cr amorphous alloy, Fe, or a material obtained by mixing them, and a powder compact obtained from such particles may be used favorably. Moreover, particles obtained by using Fe—Si—Cr, Fe—Si—Al, or Fe—Ni and forming an oxide film thereon by heat treatment may have a high saturation current, high mechanical strength, and a high insulation property and thus be used favorably. It may also be possible that the metallic magnetic particles in the form of powder are surface-treated by being coated with a metal oxide film or glass, or the core member 10 formed by using them is surface-treated by being coated with glass.

The coil conductor wire 20 may be formed of a coated conductor wire obtained by forming an insulation coating layer of a polyurethane resin, a polyester resin, or the like on an outer periphery of a metal wire of copper (Cu), silver (Ag), or the like.

The coil conductor wire 20 may have a coil portion 21 wound around the columnar portion 13 of the core member 10 and a flat-shaped connection end portion 22 provided in each of both end portions of the coil portion 21. In a state where an insulation coating of the coil conductor wire 20 has been removed, the connection end portions 22 may be connected to the terminal electrode 30 (electrode portions 301 and 302), respectively.

A length, a wire diameter, and a cross-sectional shape of the coil conductor wire 20 may not be particularly limited and appropriately set in accordance with specifications. In this embodiment, as the coil conductor wire 20, a polyurethane copper wire (UEW) having a wire diameter of about 100 μm may be used. As thus described, a coil conductor wire having a metal wire relatively thicker than that used in a conventional small-sized coil element may be used, so that there can be formed a coil element that has low direct current resistance and can even pass a large current therethrough. A diameter of the metal wire may not be limited thereto, and a metal wire having a diameter of, for example, 50 μm to 300 μm can be used. Furthermore, as the coil conductor wire 20, there can be used not only a coil conductor wire having a circular cross section but also one having a square or rectangular cross section or a square or rectangular cross section whose corners are rounded. Moreover, a bundle of two conductor wires can also be used similarly without any particular limitation on a shape of the coil conductor wire 20.

The terminal electrode 30 may be formed on surfaces of the second plate portion 12 and composed of the two electrode portions 301 and 302. As shown in FIGS. 2A and 2B, the electrode portions 301 and 302 may be formed on two ST surface sides of the second plate portion 12, which are opposed to each other in the Y axis direction.

As shown in FIGS. 2A to 2C, the electrode portion 301 as one of the electrode portions 301 and 302 may be formed on the ST surface on a left side and extend so as to also cover a part (a vicinity of a left end) of each of the LS surface and the LT surfaces. The electrode portion 302 as the other of the electrode portions 301 and 302 may be formed on the ST surface on a right side and extend so as to also cover a part (a vicinity of a right end) of each of the LS surface and the LT surfaces. Favorably, the electrode portions 301 and 302 may extend from the LS surface up to not less than half a thickness of the second plate portion 12. Both the connection end portions 22 of the coil conductor wire 20 may be pulled out from the coil portion 21 to the LT surface on one side of the second plate portion 12 and electrically connected to the terminal electrode 30 (the electrode portions 301 and 302), respectively.

Figure 3A:
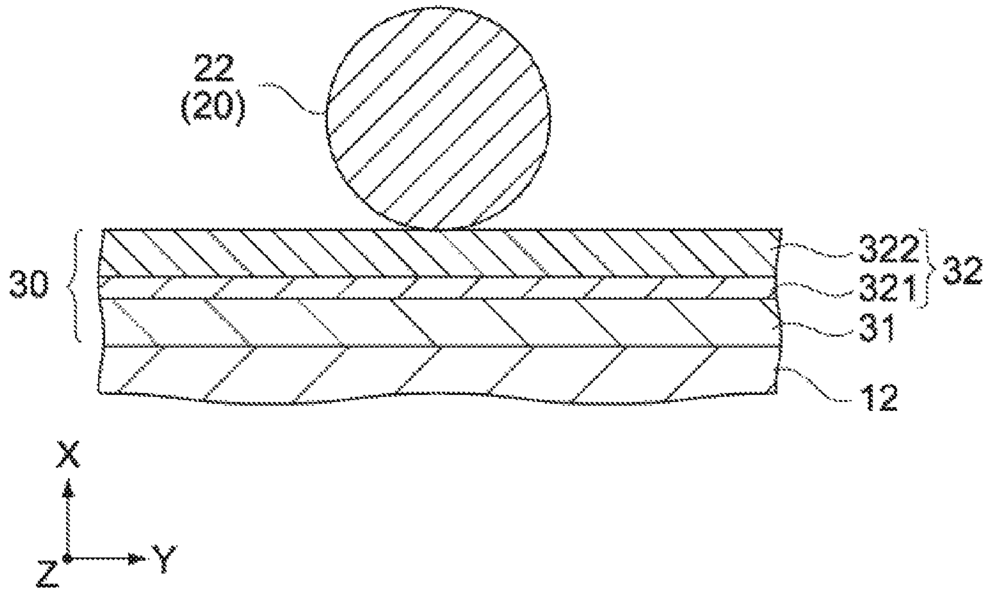
FIG. 3A is a schematic sectional view of a relevant portion, which illustrates a joining configuration between a coil conductor wire and a terminal electrode in the above-described coil element, showing a pre-joint state.
Figure 3B:
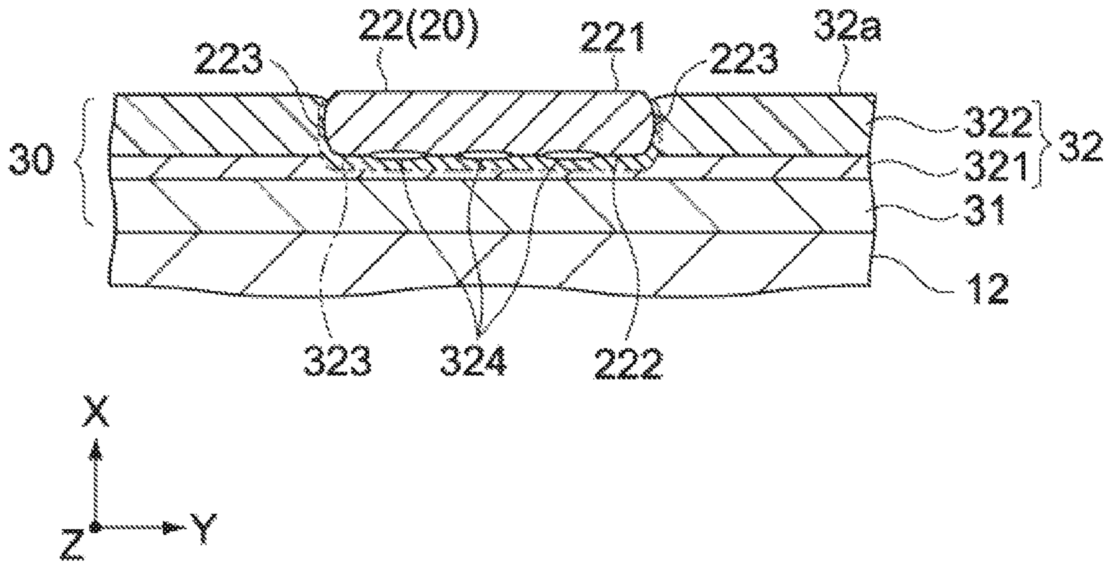
FIG. 3B is a schematic sectional view of the relevant portion, which illustrates the joining configuration between the coil conductor wire and the terminal electrode in the above-described coil element, showing a post-joint state.

FIGS. 3A and 3B are schematic sectional views of a relevant portion, which illustrate a joining configuration between the connection end portion 22 of the coil conductor wire 20 and the terminal electrode 30.

As shown in FIG. 3A, in a case where a coil conductor wire having a circular cross section is used as the coil conductor wire 20, the connection end portion 22 of the coil conductor wire 20 before being joined to the terminal electrode 30 may have a substantially circular shape. Further, in a state where a part of a peripheral surface of the connection end portion 22 is in contact with a surface of the terminal electrode 30, the connection end portion 22 may be bonded by thermocompression bonding to the terminal electrode 30 by using a heater chip heated to a predetermined temperature. A part of the insulation coating layer, which lies in the connection end portion 22, may be decomposed by heat applied in the thermocompression bonding and sublimated, thus being removed from the connection end portion 22. A thermocompression bonding method will be detailed later.

As shown in FIG. 3B, the connection end portion 22 of the coil conductor wire 20 in a state of being bonded by thermocompression bonding to the terminal electrode 30 may have a flat shape having a width dimension (a length in the Y axis direction) larger than a thickness dimension (a length in the X axis direction) thereof. The connection end portion 22 in this flat-shaped state may have a first flat surface portion 221 exposed to the exterior of the terminal electrode 30 and a second flat surface portion 222 opposed to an electrode layer 31, and two side end surfaces 223 thereof opposed to each other in the Y axis direction may be formed of a circular arcshaped curved surface. A ratio of a width of the connection end portion 22 to a thickness (or a height) thereof (hereinafter, referred to also as a dimensional ratio (W/H)) may not be particularly limited and is, for example, not less than 2.5 and not more than 4.5.

As shown in FIG. 3B, the terminal electrode 30 may have a multilayer structure composed of the electrode layer 31 and a joint layer 32 covering a surface of the electrode layer 31.

The electrode layer 31 may be formed on a surface of the second plate portion 12 of the core member 10 and opposed to the connection end portion 22 (the second flat surface portion 222) in a thickness direction (the X axis direction) of the connection end portion 22. The joint layer 32 may be formed of a conductive material used to join the connection end portion 22 and the electrode layer 31 to each other.

The electrode layer 31 may be formed of, for example, a fired body of an Ag (silver) paste or a Cu (copper) paste. In a case where the electrode layer 31 is formed of a fired body of an Ag paste, as shown in FIG. 3B, the joint layer 32 may be formed of a laminated film composed of a first conductive layer 321 and a second conductive layer 322. Typically, the first conductive layer 321 may be made of Ni (nickel) plating, and the second conductive layer 322 may be made of Sn (tin) plating.

Even though not shown, in a case where the electrode layer 31 is formed of a fired body of a Cu paste, the joint layer 32 may be formed of a single conductive layer, and the joint layer 32 in this case may be made of, for example, a solder paste. As the above-described solder paste, various solder materials such as a Sn-based solder material and an In-based solder material can be used.

A thickness of each of the electrode layer 31 and the joint layer 32 (the first conductive layer 321, the second conductive layer 322) may not be particularly limited and can be set appropriately in accordance with a size of the core member 10, a wire diameter of the coil conductor wire 20, or the like. Typically, the electrode layer 31 may have a thickness of 10 μm, the first conductive layer 321 may have a thickness of 4 μm, and the second conductive layer 322 may have a thickness of 7.5 μm to 9.5 μm.

A thickness of each of the electrode layer 31 and the joint layer 32 (the first conductive layer 321, the second conductive layer 322) may not be particularly limited and can be set appropriately in accordance with a size of the core member 10, a wire diameter of the coil conductor wire 20, or the like. Typically, the electrode layer 31 may have a thickness of 10 the first conductive layer 321 may have a thickness of 4 μm, and the second conductive layer 322 may have a thickness of 7.5 μm to 9.5 μm.

On the other hand, the second flat surface portion 222 of the connection end portion 22 may be opposed to the electrode layer 31 with the first conductive layer 321 interposed therebetween. In the first conductive layer 321 interposed between the connection end portion 22 and the electrode layer 31, there may be provided an alloy layer 323 of an alloy based on these layers. The alloy layer 323 may be formed adjacently to the second flat surface portion 222 of the connection end portion 22. A thickness of the alloy layer 323 may not be particularly limited and, typically, is not more than a thickness of the first conductive layer 321.

Typically, the alloy layer 323 may be formed of an alloy composed of a constituent metal (Cu) of the connection end portion 22 and a constituent metal (Ni) of the first conductive layer 321 or a constituent metal (Sn) of the second conductive layer 322 and produced by a diffusion phenomenon in which the constituent metal of the connection end portion 22 is diffused by heat applied in a thermocompression bonding step with respect to the connection end portion 22 and an alloying phenomenon. It may also be possible that the alloy layer 323 is provided not only in a region between the connection end portion 22 and the electrode layer 31 but also in a vicinity of an interface between each of the side end surfaces 223 of the connection end portion 22 and the second conductive layer 322.

The alloy layer 323 may form a relatively high-strength region in the joint layer 32. The alloy layer 323 may include metal components of the first conductive layer 321 and the second conductive layer 322, metal components of the second conductive layer 322 and the coil conductor wire 20, or metal components of the first conductive layer 321, the second conductive layer 322, and the coil conductor wire 20. The alloy layer 323 may include such metal components and thus have an expansion coefficient intermediary between these members, thus decreasing a difference between shrinkage and expansion caused by heat, so that stress caused between the members can be suppressed. Metal components included in the alloy layer 323 may be Ni, Sn, Cu, Ag, and so on, and examples of a principal alloy constituting the alloy layer 323 may include Ni3Sn2, Ni3Sn4, Cu6Sn5, and Cu3Sn, which are eutectic alloys.

Particularly, mechanical strength can be obtained by use of a eutectic alloy.

A diffusion range (a thickness) of the alloy layer 323 may not be particularly limited and be, in this embodiment, not more than 15 μm, and a part of the second conductive layer 322 may be present in the alloy layer 323. By this configuration, while the second conductive layer 322 may maintain adhesion to the electrode layer 31, the alloy layer 323 may increase joint strength between the second conductive layer 322 and the connection end portion 22. As a result, stable connection reliability of the connection end portion 22 can be secured. In order to obtain the alloy layer 323 thus described, desirably, an amount of heat applied at the time of joining is suppressed to a minimum.

As shown in FIG. 3B, the joint layer 32 may further include a cavity portion 324 locally provided between the connection end portion 22 of the coil conductor wire 20 and the electrode layer 31. Typically, the cavity portion 324 may be provided at an interface between the connection end portion 22 (the second flat surface portion 222) and the electrode layer 31. A part of the insulation coating layer, which lies in the connection end portion 22, may be sublimated to form a space, and the space may be enclosed in the alloy layer 323 to form the cavity portion 324. Furthermore, the alloy layer 323 may be increased in density by an alloying phenomenon between the connection end portion 22 and the electrode layer 31, and a resulting decrease in volume of the alloy layer 323 may end up forming a space constituting a part of the cavity portion 324.

As mentioned above, the cavity portion 324 may be formed mainly by sublimation of a part of the insulation coating layer, which lies in the connection end portion 22, and in order to realize this, desirably, the part of the insulation coating layer may be sublimated rapidly. Therefore, a time required from a start of joining to sublimation may be shortened. Here, pressure and heat may be applied to the connection end portion 22 at the same time by using the heater chip, and a speed at which the pressure is applied may be set to be increased. This may cause formation of the alloy layer 323 to be started concurrently with sublimation, and the cavity portion 324 may be formed so as to be enclosed inside the alloy layer 323. A proportion of the cavity portion 324 can be set to be higher as a time required for sublimation is shorter. Furthermore, a temperature used at this time could be adjusted based on a decomposition temperature of the part of the insulation coating layer, which lies in the connection end portion 22, and when a temperature substantially 100° C. higher than the decomposition temperature is used, a joining process can be performed in a short time.

Figure 4:
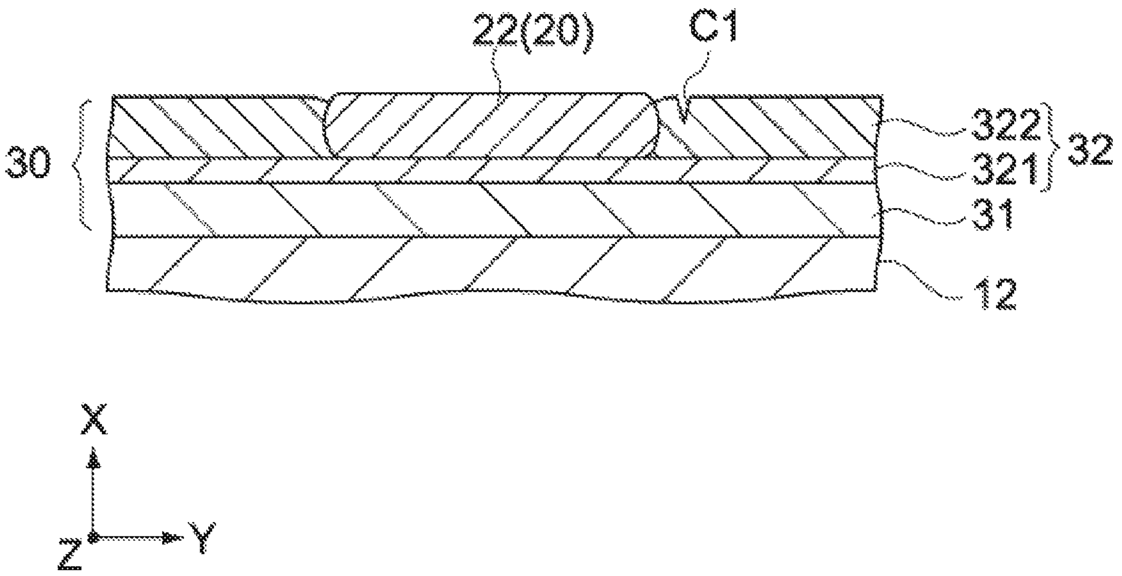
FIG. 4 is a schematic sectional view of a relevant portion of a coil element according to a comparative example.

[Effect of This Embodiment] In a wire-wound coil element, the thermocompression bonding method has been widely used in establishing connection between a coil conductor wire and a terminal electrode. In this method, heat and pressure may be applied to a connection end portion of the coil conductor wire so that, while being crushed, the connection end portion is connected to a surface of the terminal electrode. The connection end portion of the coil conductor wire in a state of being connected to the terminal electrode may have a flat shape having a width dimension larger than a height dimension thereof, as a result of which it may be likely that stress is applied thereto in a direction of said width. Because of this, for example, as schematically shown in FIG. 4, when subjected to thermal stress, an external impact, or the like, the joint layer 32 of the terminal electrode 30 may develop a defect C1 such as a crack, so that, in some cases, joint strength of the coil conductor wire 20 with respect to the terminal electrode 30 cannot be maintained over a long period of time.

In contrast, in the coil element 100 of this embodiment, the joint layer 32 of the terminal electrode 30 may have the cavity portion 324 between the connection end portion 22 of the coil conductor wire 20 and the electrode layer 31 (FIG. 3B). Therefore, stress acting in a width direction (the Y axis direction) of the connection end portion 22 or development of cracking may be absorbed and mitigated by said cavity portion 324, and thus occurrence of a defect in the joint layer or progress of a decrease in joint strength may be suppressed.

The cavity portion 324 may not be limited in number to one, and it may also be possible that a plurality of cavity portions 324 are distributed to locations on the above-described interface. The cavity portions 324 may not be limited to a simple shape as shown in the figure. Typically, the cavity portions 324 may be formed at an interface between the second flat surface portion 222 of the connection end portion 22 and the alloy layer 323, and most of the cavity portions 324 may be formed locally inside the alloy layer 323. The cavity portions 324 may all be thin layer-shaped and formed to line up side by side without overlapping each other. The cavity portions 324 formed in this manner may prevent occurrence of a large space-related loss and thus can be adopted in a small-sized thin element.

A ratio of a total length of the cavity portions 324 along the above-described width direction to the width of the connection end portion 22 may not be particularly limited and be, for example, not less than 0.05 and not more than 0.50. In a case where the above-described ratio is less than 0.05, an abundance proportion of the cavity portions 324 may be too low, and thus there may be a tendency that it becomes difficult for a stress mitigation effect by the cavity portions 324 to be effectively exhibited. On the other hand, when the above-described ratio is more than 0.50, the abundance proportion of the cavity portions 324 may be too high, and thus there may be a tendency that a joint area between the connection end portion 22 (the second flat surface portion 222) and the joint layer 32 (the first conductive layer 321) is decreased, so that joint strength is decreased. With the above-described ratio set to be in a range of not less than 0.05 and not more than 0.50, variations in strength of the joint layer may be suppressed over a long period of time, and thus reliability of the joint layer can be secured.

Moreover, the alloy layer 323 may have relatively high strength inside the joint layer 32, and thus high durability against thermal stress, external stress, or the like may be secured, so that reliability of the connection end portion 22 with respect to the terminal electrode 30 may be enhanced.

As thus described, according to this embodiment, even in a case of using a coil conductor wire having a relatively large wire diameter, the connection end portion 22 thereof can be joined to the terminal electrode 30 with high reliability, and thus reliability of connection strength of the coil conductor wire can be enhanced, while achieving a reduction in resistance and a size reduction.

[Manufacturing Method] Next, a description is given of a method for manufacturing the thus configured coil element 100 of this embodiment.

The core member 10 of a drum core type made of Ni—Zn ferrite shown in FIGS. 2A to 2C may be fabricated. Subsequently, the terminal electrode 30 (301, 302) may be formed on the second plate portion 12 of the core member 10.

First, an Ag paste may be applied by transfer to a predetermined region of the second plate portion 12, which includes the ST surfaces, and then a baking process may be performed at, for example, 680° C., so that the electrode layer 31 having a thickness of 10 μm may be formed. Subsequently, the first conductive layer 321 made of Ni plating and having a thickness of 2 μm to 6 μm may be formed on the surface of the electrode layer 31, and the second conductive layer 322 made of Sn plating and having a thickness of 4 μm to 10 μm may be formed on a surface of the first conductive layer 321.

Subsequently, the coil conductor wire 20 may be wound a predetermined number of turns on the columnar portion 13 of the core member 10 thus provided with the terminal electrode 30, and then both the connection end portions 22 of the coil conductor wire 20 may be connected to the terminal electrode 30 (301, 302), respectively.

The thermocompression bonding method may be used to establish connection between the connection end portion 22 and the terminal electrode 30. In this process step, the connection end portion 22 of the coil conductor wire 20 may be positioned immediately above the terminal electrode 30, and then the connection end portion 22 may be bonded by thermocompression bonding to the terminal electrode 30 by using an unshown heater chip, a solder iron, or the like (FIG. 3A, FIG. 3B). At this time, the connection end portion 22 in a state of being covered at its periphery with the insulation coating layer may be bonded to the terminal electrode 30 by thermocompression bonding.

In the thermocompression bonding step, weight and heat may be applied to the connection end portion 22 at the same time by using the heater chip so as to cause a bonding reaction between the deformed connection end portion 22 and the joint layer 32 of the terminal electrode 30. To this end, the heater chip may be heated to a temperature high enough to cause deformation of the connection end portion 22 and apply pressure to the connection end portion 22 from a position away from the connection end portion 22 to such a position that the connection end portion 22 is compressed to a predetermined thickness. By using the heater chip, the connection end portion 22 may be heated at a temperature of, for example, 700° C. A magnitude of weight to be applied can be set in accordance with a wire diameter of the coil conductor 20, and as a weight application method, there can be adopted a method in which a weight application stop position is set so that sufficient weight is applied to attain a set dimension of the connection end portion 22.

Preferably, a pressure application operation performed at this time by using the heater chip may be adjusted so that pressure is applied for a relatively short time, while a relatively long time is spent to release a pressing force thus applied. By this configuration, disappearance by decomposition of a part of the insulation coating layer of the coil conductor wire 20, which locally remains between the connection end portion 22 and the electrode layer 31, may be accelerated, thus making it possible to relatively easily form the alloy layer 323 and the cavity portion 324 between the connection end portion 22 and the electrode layer 31.

A pressure application speed at which pressure is applied to the connection end portion 22 by using the heater chip may vary depending on a wire diameter of the coil conductor wire 20 and be set to be higher as the wire diameter is larger. Typically, the pressure application speed may be set to substantially 5 mm/s to 30 mm/s (millisecond). With the pressure application speed set to be in the abovedescribed range, it may become possible to appropriately form the alloy layer 323 and the cavity portion 324 in the joint layer 32.

EXAMPLES

While the following describes examples of the present invention, needless to say, the present invention may not be limited to the examples described below.

(Example 1) After fabricating the core member 10 having the terminal electrode 30 shown in FIGS. 2A to 2C by the above-mentioned method, the connection end portion 22 of the coil conductor wire 20 wound on the columnar portion 13 was bonded by thermocompression bonding to the terminal electrode 30 by following a procedure below.

By using a heater chip heated to 700° C., pressure was applied to the connection end portion 22 with the insulation coating layer provided thereon, having a wire diameter (φ) of 75 μm, toward the terminal electrode 30 at a speed of 10 mm/s until the connection end portion 22 attains a dimensional ratio (W/H) of 2.1, after which the heater chip was stopped from operating, and that state was retained for 0.3 seconds. After that, the heater chip was separated from the connection end portion 22 at a speed of 10 mm/s, and thus a pressure force with respect to the connection end portion 22 was released.

Subsequently, a range of the alloy layer 323 and a proportion of the cavity portion 324 in the terminal electrode 30 having the coil conductor wire 20 connected thereto were measured.

Figure 5:
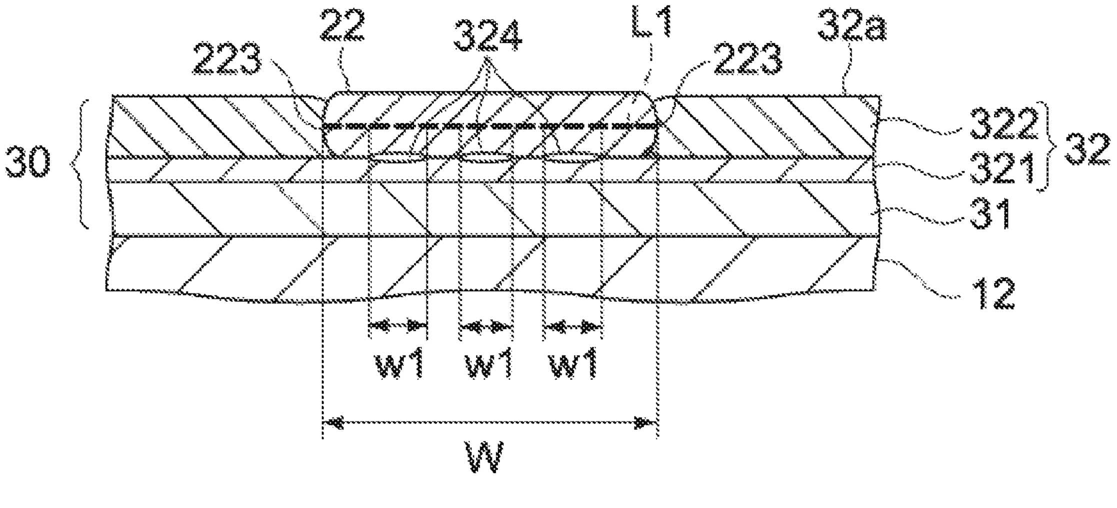
FIG. 5 is a schematic sectional view of a relevant portion showing one example of an effect of the present embodiment.

The range of the alloy layer 323 was determined based on a diffusion range of an alloy. As a measurement method, based on 500-times and 3000-times magnification photographs of a cross section of the joint layer 32 taken with an SEM (scanning-type electron microscope), a thickness of the alloy layer 323 as seen from a midpoint of the connection end portion 22 in the width direction toward the second conductive layer 322 was determined. More specifically, as schematically shown in FIG. 5, a normal may be drawn down in the second conductive layer 322 from a midpoint of a straight line L1 connecting between both side end portions of the connection end portion 22, and a portion on this normal, where there is a contrast difference from the connection end portion 22, the first conductive layer 321, and the second conductive layer 322 may be defined as the alloy layer 323 and also used to define a thickness of the alloy layer 323. The thickness of the alloy layer 323, however, may be assumed to include the cavity portion 324.

As for a proportion of the cavity portion 324, based on 500-times and 3000 times magnification photographs of a cross section of the joint layer 32 taken with the SEM (scanning-type electron microscope), a total length of the individual cavity portions 324 along the width direction of the connection end portion 22 was calculated, and a ratio of the above-described total length to the width of the connection end portion 22 was calculated. More specifically, as schematically shown in FIG. 5, a length of the straight line L1 connecting between both the side end portions 223 of the connection end portion 22 was defined as a width (W) of the connection end portion 22, and a normal was drawn down from the straight line L1 to each of the cavity portions 324 and used to calculate a total length of width dimensions (w1) of the cavity portions 324. Here, only cavity portions having a value of w1 of not less than 2 μm were used in the calculation.

Meanwhile, with regard to each coil element fabricated, a comparison was made of joint strength of the coil conductor wire 20 (the connection end portion 22) with respect to the terminal electrode 30 between before and after a heat cycle test, and variations in the strength were evaluated. Moreover, presence/absence of a defect (a crack) in the surface 32*a* of the joint layer 32 after the above-described heat cycle test was determined.

In the heat cycle test, a temperature was made to vary in a range of −40° C. to 125° C., and 1000 cycles of this process were performed repeatedly. Joint strength was determined by obtaining an average value (the number of samples used was 20) of tensile strength measured with a tension meter by engaging a hook with the coil conductor wire 20 in a joined state. Presence/absence of a surface defect of the joint layer 32 was evaluated by visual observation of a 100-times expanded image.

A result of the evaluation found that a range of the alloy layer was 1 μm, a proportion of the cavity portion was 5%, and joint strength after the test was 99 gf (100 gf before the test), with no surface defects observed.

(Example 2) Except that a dimensional ratio (W/H) of the connection end portion when bonded by thermocompression bonding was set to 2.5, a coil element was fabricated by a similar method to the above-mentioned method used in Example 1 and evaluated. As a result, it was found that a range of the alloy layer was 4 μm, a proportion of the cavity portion was 10%, and joint strength after the test was 106 gf (108 gf before the test), with no surface defects observed.

(Example 3) Except that a dimensional ratio (W/H) of the connection end portion when bonded by thermocompression bonding was set to 3.4, a coil element was fabricated by a similar method to the above-mentioned method used in Example 1 and evaluated. As a result, it was found that a range of the alloy layer was 7 μm, a proportion of the cavity portion was 30%, and joint strength after the test was 108 gf (106 gf before the test), with no surface defects observed.

(Example 4) Except that a dimensional ratio (W/H) of the connection end portion when bonded by thermocompression bonding was set to 4.0, a coil element was fabricated by a similar method to the above-mentioned method used in Example 1 and evaluated. As a result, it was found that a range of the alloy layer was 8 μm, a proportion of the cavity portion was 40%, and joint strength after the test was 102 gf (102 gf before the test), with no surface defects observed.

(Example 5) Except that a dimensional ratio (W/H) of the connection end portion when bonded by thermocompression bonding was set to 4.3, a coil element was fabricated by a similar method to the above-mentioned method used in Example 1 and evaluated. As a result, it was found that a range of the alloy layer was 10 μm, a proportion of the cavity portion was 50%, and joint strength after the test was 96 gf (96 gf before the test), with no surface defects observed.

(Example 6) Except that a dimensional ratio (W/H) of the connection end portion when bonded by thermocompression bonding was set to 3.4, a pressure application speed of the heater chip was set to 15 mm/s, and a pressure release speed of the heater chip was set to 20 mm/s, a coil element was fabricated by a similar method to the above-mentioned method used in Example 1 and evaluated. As a result, it was found that a range of the alloy layer was 7 μm, a proportion of the cavity portion was 40%, and joint strength after the test was 104 gf (104 gf before the test), with no surface defects observed.

(Example 7) Except that a dimensional ratio (W/H) of the connection end portion when bonded by thermocompression bonding was set to 3.4, a pressure application speed of the heater chip was set to 25 mm/s, and a pressure release speed of the heater chip was set to 20 mm/s, a coil element was fabricated by a similar method to the above-mentioned method used in Example 1 and evaluated. As a result, it was found that a range of the alloy layer was 7 μm, a proportion of the cavity portion was 50%, and joint strength after the test was 94 gf (94 gf before the test), with no surface defects observed.

(Comparative Example) Except that a pressure application speed and a pressure release speed of the heater chip were each set to 1 mm/s and a heater chip holding time was set to one second, a coil element was fabricated by a similar method to the above-mentioned method used in Example 1 and evaluated. As a result, it was found that a range of the alloy layer was 20 μm, a proportion of the cavity portion was 0%, and joint strength after the test was 84 gf (100 gf before the test), with surface defects observed.

The evaluation results of Examples 1 to 7 and Comparative Example are summarized in Table 1. In Table 1, as for evaluation results of a side-surface defect, presence of a defect is indicated by "P", and absence of a defect is indicated by "A".

TABLE 1

| | Dimension of Conductor Wire φ [μm] | Dimensions of Conductor Wire at Joint Portion W [μm] | Dimensions of Conductor Wire at Joint Portion H [μm] | Dimensional Ratio W/H | Alloy Diffusion Layer [μm] | Proportion of Cavity Portion [%] | Joint Strength Before Test [gf] | Joint Strength After Test [gf] | Side-surface Defect After Test |
|---|---|---|---|---|---|---|---|---|---|
| Comparative Example | 75 | 95 | 46 | 2.1 | 20 | 0 | 100 | 84 | P |
| Example 1 | 75 | 95 | 46 | 2.1 | 1 | 5 | 100 | 99 | A |
| Example 2 | 75 | 105 | 41 | 2.5 | 4 | 10 | 108 | 106 | A |
| Example 3 | 75 | 120 | 35 | 3.4 | 7 | 30 | 106 | 108 | A |
| Example 4 | 75 | 130 | 32 | 4.0 | 8 | 40 | 102 | 102 | A |
| Example 5 | 75 | 135 | 31 | 4.3 | 10 | 50 | 96 | 96 | A |
| Example 6 | 75 | 120 | 35 | 3.4 | 7 | 40 | 104 | 104 | A |
| Example 7 | 75 | 120 | 35 | 3.4 | 7 | 50 | 94 | 94 | A |

In Comparative Example, while joint strength before the test may be relatively high, the joint strength may be significantly decreased after the test. As a reason for this, during thermocompression bonding, the connection end portion of the coil conductor wire may be kept in contact with the heater chip for a long time compared with that in Examples 1 to 7, and thus an amount of heat inputted to the terminal electrode may be excessively increased, so that the alloy layer may be formed over a wide range. Presumably, as a result of this, in the heat cycle test, it became likely that peeling occurred between the connection end portion and the electrode layer, so that durability with respect to thermal stress was decreased, resulting in, for example, occurrence of a defect in the surface of the joint layer, which led to a decrease in joint strength.

In contrast, according to Examples 1 to 7, a pressure application speed, a heater chip holding time, and a pressure release speed in applying pressure to the connection end portion by using the heater chip may be set to be smaller (or shorter) than in Comparative Example, and thus an amount of heat inputted to the terminal electrode may be suppressed, so that a formation range of the alloy layer can be restricted. For this reason, durability against thermal stress or the like may be increased, and thus variations in joint strength between before and after a heat cycle may be suppressed to zero or a minimum, so that reliability of the joint layer may be enhanced.

Furthermore, according to Examples 1 to 4 and 6 in which a proportion of the cavity portion was set to not less than 5% and not more than 40%, compared with Examples 5 and 7 in which a proportion of the cavity portion was set to 50%, relatively high joint strength was obtained before and after the test. By suppressing a proportion of the cavity portion to a proper range, a coil element having high joint strength can be manufactured more stably.

While the foregoing has described the embodiment of the present invention, needless to say, the present invention is not limited only to the above-mentioned embodiment, and various modifications can be made thereto.

For example, while the foregoing embodiment uses a coated conductor wire having a circular cross section as the coil conductor wire 20, without any limitation thereto, it may also be possible to use a flat-shaped coated conductor wire such as a rectangular wire.

Figure 6:
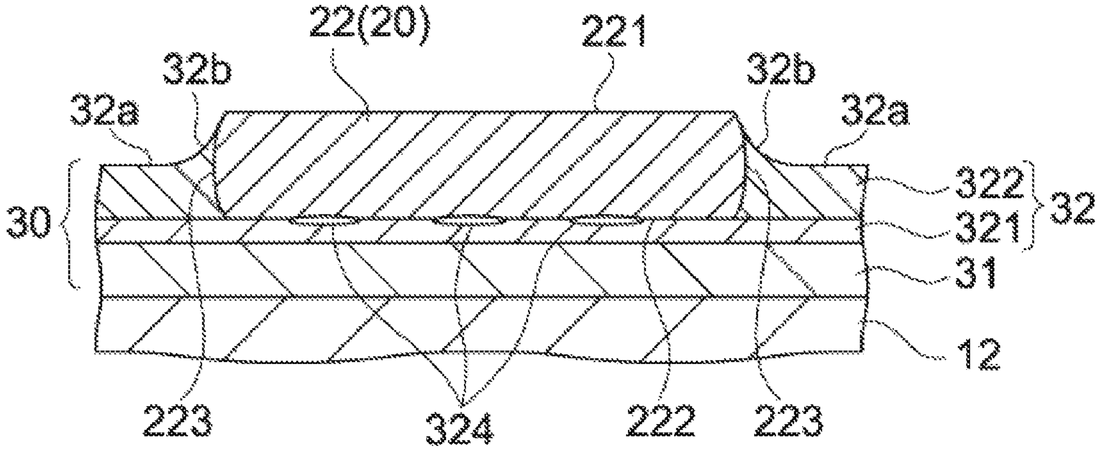
FIG. 6 is a schematic sectional view of a relevant portion showing a modification example of a configuration of the coil element according to the present embodiment.

Furthermore, while in the foregoing embodiment, a surface (the first flat surface portion 221) of the connection end portion 22 of the coil conductor wire 20 may be formed to be flush with the surface 32*a* of the joint layer 32 of the terminal electrode 30 (see FIG. 3B), without any limitation thereto, it may also be possible that, for example, as shown in FIG. 6, the surface (the first flat surface portion 221) of the connection end portion 22 is formed so as to protrude outward from the surface 32*a* of the joint layer 32.

In this case, there may be formed a skirt portion 32*b* having a height from the electrode layer 31, which decreases with increasing distance from each of the side end surfaces 223 of the connection end portion 22. With the joint layer 32 having such a configuration provided around the connection end portion 22, joint strength of the connection end portion 22 with respect to the terminal electrode 30 can be further improved.

What is claimed is:

1. A method for manufacturing a coil element, comprising:
- preparing a core member having a columnar portion;
- forming a terminal electrode on a surface of the core member, the terminal electrode having an electrode layer;
- winding a conductor wire on the columnar portion of the core member, the conductor wire having an end portion; and
- bonding the end portion of the conductor wire to the terminal electrode by thermocompression bonding such that at least one cavity is formed between the end portion of the conductor wire and the electrode layer.

2. The method according to claim 1, wherein the bonding includes deforming the end portion into a flat shape.

3. The method according to claim 1, wherein the forming the terminal electrode comprises:
- forming an electrode layer on the surface of the core member;
- forming a first conductive layer on the electrode layer; and
- forming a second conductive layer on the first conductive layer.

4. The method according to claim 3, wherein the bonding includes forming an alloy layer between the end portion of the conductor wire and the first conductive layer.

5. The method according to claim 3, wherein the bonding includes forming an alloy layer between the end portion and the first conductive layer and between the end portion and the second conductive layer.

6. The method according to claim 1, wherein the bonding includes applying pressure to the end portion of the conductor wire at a pressure application speed ranging from 5 mm/s to 30 mm/s.

7. The method according to claim 1, wherein the conductor wire has an insulation coating layer.

8. The method according to claim 7, wherein the bonding includes sublimating the insulation coating layer.

9. The method according to claim 7, wherein the bonding includes heating the end portion of the conductor at a temperature 100° C. higher than a decomposition temperature of the insulation coating layer.

10. The method according to claim 7, wherein the bonding includes heating the end portion of the conductor at a temperature of 700° C.

11. The method according to claim 1, wherein said at least one cavity includes a plurality of cavities.

* * * * *